United States Patent [19]

Asai et al.

[11] 3,968,088
[45] July 6, 1976

[54] PROCESS FOR PREPARING A THERMOPLASTIC RESIN

[75] Inventors: Harumi Asai; Akira Wada, both of Kamakura, Japan

[73] Assignee: Nippon Zeon Co., Ltd., Tokyo, Japan

[22] Filed: Apr. 29, 1974

[21] Appl. No.: 464,905

[30] Foreign Application Priority Data

May 7, 1973 Japan.............................. 48-50485

[52] U.S. Cl.............................. 526/283; 526/294; 526/295; 526/335
[51] Int. Cl.............................. C08d 102; C08d 304
[58] Field of Search............................. 260/82.1, 80.7

[56] References Cited
UNITED STATES PATENTS

| | | | |
|---|---|---|---|
| 2,352,979 | 7/1944 | Soday | 260/82.1 X |
| 2,352,980 | 7/1944 | Soday | 260/82.1 X |
| 3,084,147 | 4/1963 | Wilks | 260/93.1 |
| 3,306,868 | 2/1967 | Adrian | 260/82.1 X |

*Primary Examiner*—William F. Hamrock
*Attorney, Agent, or Firm*—Sherman & Shalloway

[57] ABSTRACT

A process for preparing a substantially gel-free thermoplastic resin having a softening point of 50°–180°C., an iodine value not exceeding 180 and a Gardner color of not more than 5 by heating at a temperature of 250°–300°C. a solution of a monomeric mixture consisting of 90–65% by weight of a cyclopentadiene type monomer and 10–40% by weight of a chain conjugated diolefin monomer of 4–5 carbon atoms at a monomer concentration of 70–95% by weight in a hydrocarbon solvent inert to thermal polymerization conditions to effect the thermal polymerization of the monomeric mixture and thereafter recovering the resulting polymer from the solvent.

6 Claims, No Drawings

PROCESS FOR PREPARING A THERMOPLASTIC RESIN

This invention relates to a process for preparing a new thermoplastic resin. More particularly, this invention relates to a process for preparing a new thermoplastic resin which not only excels in color and is soluble in the aromatic hydrocarbon solvents but also is a resin whose softening point and iodine value have been controlled. The novel resin is obtained by the thermal polymerization of a mixture consisting of a cyclopentadiene type monomer and a chain conjugated diolefin monomer.

Methods of thermally polymerizing the cyclopentadiene type monomers or mixtures of cyclopentadiene type monomers with other copolymerizable vinyl monomers have been well known for a long time. For instance, the process for the preparation of a thermoplastic resin by the thermal polymerization of a mixture of a cyclopentadiene type monomer and vinyl acetate at 390° – 575°F. (199° – 302°C.) (U.S. Pat. No. 2,599,790) and the process for preparing a thermoplastic resin by the thermal polymerization at 200°–350°C. of a mixture of a cyclopentadiene type monomer and a vinyl monomer not containing a conjugate double bond (principally styrene) (U.S. Pat. No. 2,689,232) have been known for a very long time. Further, a process for the thermal polymerization of the cyclopentadiene type monomer alone (U.S. Pat. No. 3,084,147 and Japanese Patent Publication No. 47-43307) and a process for the thermal polymerization of fractions boiling in the range of 20° – 280°C. and containing the cyclopentadiene type monomer obtained by cracking naphtha (British Pat. No. 1,202,802) have been found by subsequent research.

Due to the fact that the thermoplastic resins obtained by these processes, as compared with the resins obtained by the cationic polymerization of the same starting monomers with a Friedel-Crafts type catalyst, possess an excellent color and further because of their content of a relatively large amount of the unsaturated bonds these resins are exceedingly reactive, and are usable, after modification, as desired, with maleic acid for example, for a wide variety of purposes such as for alkyd resin coating materials, printing inks, vinyl chloride resins as well as a compounding agent for rubber. However, the conventional processes for preparing this type of thermoplastic resin had in all instances merits as well as demerits and thus could not be regarded as being entirely satisfactory.

For instance, while the method of thermally polymerizing a mixture of a cyclopentadiene type monomer and a vinyl monomer is a very desirable method in that the softening point and iodine value of the resulting resin can be suitably adjusted, it has, on the other hand, the shortcoming that there is a decline in the color of the resin when the vinyl monomer is styrene, acrylonitrile or vinyl acetate. Again, in the case of the process which uses the fractions boiling in the range of 20° – 280°C. and containing the cyclopentadiene type monomer, there is the drawback that the concentration of the cyclopentadiene type monomer is exceedingly low, and moreover there are present a large amount of other olefins, with the consequence that not only does the reaction speed show a marked decline, but also it frequently happens that a resinous polymer cannot be obtained.

Such being the case, a method of separating the low boiling and high boiling fractions from the foregoing fractions and using as the principal component the dicyclopentadiene-containing fractions boiling in the range of 100° – 180°C. (French Pat. No. 1,500,162) would seem to be a more desirable method. However, this method also had its shortcoming in that the color of the resulting thermoplastic resin was not acceptable. Hence, this method was also not entirely satisfactory.

Accordingly, of the conventional methods, a method in which a relatively pure cyclopentadiene type monomer is thermally polymerized alone, e.g., a method of thermally polymerizing either cyclopentadiene or dicyclopentaiene by heating same for 0.5 – 10 hours at 250° – 300°C. in an inert solvent in the absence of a catalyst (Japanese Patent Publication No. 47-43307) is generally considered as being a suitable method for obtaining a thermoplastic resin having an excellent color. However, the resin formed by this method has the following shortcomings. It contains portions that are insoluble in such aromatic hydrocarbon solvents as benzene, toluene and xylene. In addition, since its iodine value exceeds 200, it is readily oxidized by means of air to result in an increase in the insoluble portions. Further, when the polymerization is carried out by this method, there is a tendency to the formation of a resin having a high softening point. Thus, for obtaining the usually desired thermoplastic resin having a softening point of not higher than 180°C., either the monomer concentration must be reduced or the rate of conversion must be held at low level for controlling the softening point of the resin. Hence, difficulty was experienced in producing the resin efficiently by raising the monomer concentration and the rate of conversion.

A primary object of the present invention is to provide a process for preparing efficiently a thermoplastic resin which not only excels in color but also is soluble in the aromatic hydrocarbon solvents as well as is free of gel.

Another object of this invention is to provide a process for preparing a thermoplastic resin whose softening point has been controlled such as to be not higher than 180°C.

Still another object of the invention is to provide a process for preparing a thermoplastic resin whose iodine value does not exceed 180 and hence excels in its stability to oxidation by air.

In the course of carrying out extensive research with a view to achieving the foregoing objects, we found that results quite impossible of prediction from the findings of the prior art could be obtained by thermally polymerizing a mixture consisting of a cyclopentadiene type monomer and a chain conjugated diolefin monomer, and thus the present invention was perfected.

Thus, as a method of preparing a thermoplastic resin which meets the foregoing objects, there is provided in accordance with the present invention a process which comprises heating at a temperature of 250° – 300°C. a solution of a monomeric mixture consisting of 90 – 60% by weight of a cyclopentadiene type monomer and 10 – 40% by weight of a chain conjugated diolefin monomer of 4 – 5 carbon atoms at a monomer concentration of 70 – 95% by weight in a hydrocarbon solvent inert to thermal polymerization conditions to carry out the thermal polymerization of the monomeric mixture and thereafter recovering the resulting polymer from the solvent.

In this invention shortcomings seen in the case where the cyclopentadiene type monomer is thermally polymerized alone are readily solved as a result of having thermally polymerized a mixture of a cyclopentadiene type monomer and a chain conjugated diolefin monomer. That is to say, in accordance with the present invention, the generally desired resin having a softening point of not higher than 180°C. can be prepared even when the polymerization has been carried out at a high monomer concentration, and the resulting resin contains substantially no gels that are insoluble in the aromatic hydrocarbon solvents. Moreover, the resin obtained by the invention process exhibits a color excelling that of the homopolymer of the cyclopentadiene type monomer. In addition, since its iodine value does not exceed 180, it is stable to oxidation by air.

As the cyclopentadiene type monomer, one of the monomeric components to be used in the present invention, included are cyclopentadiene, methylcyclopentadiene, dicyclopentadiene, methyldicyclopentadiene and dimethylcyclopentadiene. These monomers may be used either singly or in combinations of two or more thereof.

Generally speaking, in the thermal polymerization of the cyclopentadiene monomers, there is a tendency to the formation of polymers having softening points that are too high or polymers that are insoluble in the aromatic hydrocarbon solvents, as the purity of monomers becomes high. However, a phenomenon of this sort does not occur in this invention. Hence, monomers of high purity can be used. The procurement commercially of pure cyclopentadiene type monomers is actually a difficult matter, though. Hence, the fractions containing the cyclopentadiene type monomers as their key component are actually monomers of the highest purity that are available. Of these fractions, that in which the content of dicyclopentadiene is at least 90% by weight and the total content of the cyclopentadiene type monomers is at least 95% by weight is most suitable for use in the present invention.

As the chain conjugated diolefin, the other monomeric component used in this invention, included are 1,3-butadiene, isoprene, 1,3-pentadiene and chloroprene. These monomers may be used either singly or in combinations of two or more thereof. Again, the $C_4$ or $C_5$ fraction containing these monomers as its key component and containing, in addition, a small amount of other inert hydrocarbons can also be used.

The proportion in which the cyclopentadiene type monomer and the chain conjugated diolefin monomer are mixed is one of the important conditions in this invention. The chain conjugated diolefin monomer must account for 10 – 40% by weight, and preferably 10 – 30% by weight, of the mixture. When the amount of the chain conjugated dolefin monomer is less than 10% by weight, the effects that are had by the addition of the chain conjugated dolefin monomer is small. On the other hand, when 40% by weight is exceeded, this also is undesirable, since there is a marked decline in the reaction speed. Further, these mixtures may also contain a small amount of other comonomers that participate in the thermal polymerization reaction. These comonomers derive in most cases from the impurities contained in either the cyclopentadiene type monomer or chain conjugated diolefin monomer. If these comonomers are contained in too great a quantity in the foregoing monomeric mixture, either the polymerization reaction is impaired or there is a decline in the physical properties of the resulting resin. Hence, it is necessary to control the content of these comonomers in the foregoing monomeric mixture to an amount not more than 10% by weight, and preferably not more than 5% by weight.

While the mixing of the cyclopentadiene type monomer and the chain conjugated diolefin monomer is usually carried out before the polymerization is to be started, there is imposed no particular restriction in this respect, and it is also possible to add the chain conjugated diolefin monomer continuously or intermittently during the course of the polymerization reaction.

The polymerization of the mixture of a cyclopentadiene type monomer and a chain conjugated diolefin monomer is carried out in this invention by heating the mixture in a solvent inert to the reaction for 0.5 – 10 hours, and preferably 1 – 5 hours, at a temperature of 250° – 300°C., and preferably 260° – 280°C. In carrying out this polymerization reaction, it is preferred that it be carried out under a gaseous atmosphere inert to the reaction, such as nitrogen or argon. Further, it is already known that reaction temperature of 250° – 300°C. is an indispensable condition for preparing useful thermoplastic resins by the thermal polymerization of the cyclopentadiene type monomers, and that at less than 250°C. a waxy polymer is formed, while at temperatures exceeding 300°C., the control of the reaction becomes difficult.

The solvents used in the present invention are those which are inert to the polymerization reaction, included being, for example, benzene, toluene, xylene, kerosene, hexane and pentane. These solvents must be present in at least an amount that is minimally required for maintaining the reaction system in a uniform state, preferred being an amount that is 5 – 30% by weight of the total of same and the monomeric mixture.

The polymerization reaction may be carried out either batchwise or continuously. In either case, it is preferred that a conversion of at least 70% be achieved in order to accomplish the efficient production of the resin.

The thermoplastic resin obtained by the invention process has a softening point of 50° – 180°C., a Gardner color of not more than 5, an iodine value not exceeding 180 and is a gel-free resin which is completely soluble in such aromatic hydrocarbon solvents as benzene, toluene, and xylene. This resin, after being submitted to suitable modification treatments, as desired, can be used, as in the case with the resin obtained by the thermal polymerization of the cyclopentadiene type monomers, in such areas as coating materials, printing inks, floor tiles, rubber compounding agents, paper and textile treatment agent, adhesives and paper sizing agents.

The following examples will be given for more fully illustrating the invention.

Example 1

An autoclave of 1-liter capacity was charged with 432 grams of dicyclopentadiene and 120 grams of xylene and, after the further addition of 48 grams of a chain conjugated diolefin indicated in Table 1, the mixture was heated for 3 hours at 260°C. under a nitrogen atmosphere. The reaction product was distilled at 230°C. to recover the unreacted dicyclopentadiene and xylene and obtain a thermoplastic resin at the yield shown in Table 1.

As control, similar experiments were conducted, on being that in which the conjugated diolefin was not used, and another being that where styrene or acrylonitrile was used instead of the conjugated diolefin.

The resulting resins were then measured for their softening points (JIS Method K2817 — ring and ball method), Gardner color, toluene-insoluble portion (the portion that is insoluble when 10 grams of the resin is dissolved in 40 grams of toluene at room temperature), iodine value (Wijs method) and toluene-insoluble portion after being allowed to stand for 5 days at room temperature. The results are shown in Table 1.

Example 2

The polymerization reaction was carried out by operating exactly as in Example 1, except that the amounts of dicyclopentadiene and 1,3-pentadiene were varied as indicated in Table 2. The results obtained are shown in Table 2.

Table 2

| Experiment No. | Composition of charge Dicyclopentadiene* (gm) | 1,3-pentadiene** (gm) | Xylene (gm) | Yield (%) | Softening point (°C.) | Gardner color | Toluene-insoluble portion after 5 days (wt. %) | Iodine value |
|---|---|---|---|---|---|---|---|---|
| 1 (control) | 480 | — | 120 | 90.7 | 218.0 | 5 – 6 | 8.9 | 235 |
| 7 (invention) | 420 | 60 | 120 | 90.3 | 175.0 | 3 – 4 | 0 | 169 |
| 8 (invention) | 390 | 90 | 120 | 89.1 | 155.0 | 3 – 4 | 0 | 166 |
| 9 (invention) | 360 | 120 | 120 | 88.8 | 120.5 | 3 – 4 | 0 | 163 |
| 10 (control) | 240 | 240 | 120 | 50.5 | 75.0 | 3 – 4 | 0 | 165 |

*The same as in Table 1.
**1,3-pentadiene 73.5% by weight, isoprene 8.9% by weight, cyclopentadiene 7.8% by weight, dicyclopentadiene 5.9% by weight, others 3.9% by weight.

Table 1

| Experiment No. | | 1 (control) | 2 (invention) | 3 (invention) | 4 (invention) | 5 (control) | 6 (control) |
|---|---|---|---|---|---|---|---|
| Composition of charge | Dicyclopentadiene* (gm) | 480 | 432 | 432 | 432 | 432 | 432 |
| | 1,3-butadiene (gm) | — | 48 | — | — | — | — |
| | 1,3-pentadiene (gm) | — | — | 48 | — | — | — |
| | Isoprene (gm) | — | — | — | 48 | — | — |
| | Styrene (gm) | — | — | — | — | 48 | — |
| | Acrylonitrile (gm) | — | — | — | — | — | 48 |
| | Xylene (gm) | 120 | 120 | 120 | 120 | 120 | 120 |
| Yield (wt. %) | | 90.7 | 89.9 | 90.2 | 91.3 | 87.5 | 82.4 |
| Softening point (°C.) | | 218.0 | 167.5 | 172.0 | 175.0 | 178.0 | 156.0 |
| Gardner color | | 5 – 6 | 3 – 4 | 3 – 4 | 3 – 4 | 6 – 7 | 5 – 6 |
| Toluene-insoluble portion (wt. %) | | 2.8 | 0 | 0 | 0 | 0 | 0 |
| Iodine value | | 235 | 176 | 170 | 168 | 176 | 183 |
| Toluene-insoluble portion after 5 days (wt. %) | | 8.9 | 0 | 0 | 0 | 0 | 0 |

*Dicyclopentadiene 95.3% by weight, methyldicyclopentadiene 1.7% by weight, and others 3.0% by weight.

It can be seen from these results that in the case where a chain conjugated diolefin is caused to be copresent in the reaction system in accordance with the present invention the softening point and iodine value of the resulting resin decline and its color is improved. Again, it is seen that this resin does not contain toluene-insoluble portions, and also that toluene-insoluble portions due to oxidation by air do not form even though the resin is left standing for five days. On the other hand, while the resin obtained by causing the copresence in the reaction system of a vinyl monomer such as styrene or acrylonitrile shows a decline in the softening point and iodine value, no improvement is had in the color of the resin.

It is seen from these results that the softening point of the resulting resin declines as the amount of 1,3-pentadiene is increased. However, it is seen that the presence of the 1,3-pentadiene in an amount of 50% by weight is undesirable, since there is marked decline in the reaction speed.

Example 3

A mixture consisting of 5.04 kg of dicyclopentadiene, 0.56 kg of 1,3-pentadiene and 1.4 kg of xylene was charged to an autoclave of 10-liter capacity and heated for 3 hours under a nitrogen atmosphere. The resulting resin had a softening point of 165.5°C.

Next, as control, the experimentation was carried out without using the 1,3-pentadiene, and for obtaining a resin having a softening point nearly the same as that of the foregoing resin, the rate of conversion was reduced by using a reaction time of one hour. The results obtained are shown in Table 3.

Table 3

| Experiment No. | Composition of charge | | | Yield (%) | Softening point (°C.) | Gardner color | Toluene-insoluble portion (wt.%) |
| --- | --- | --- | --- | --- | --- | --- | --- |
| | Dicyclopentadiene* (kg) | 1,3-pentadiene (kg) | Xylene (kg) | | | | |
| 11 (control) | 5.6 | — | 1.4 | 70.2 | 170.5 | 4 – 5 | 6.8 |
| 12 (invention) | 5.04 | 0.56 | 1.4 | 89.5 | 165.5 | 3 – 4 | 0 |

*The same as in Table 1.

It can be seen from these results that in the control toluene-insoluble portions are also formed in the case where a resin of low softening point is prepared.

We claim:

1. A process for preparing a substantially gel-free thermoplastic resin having a softening point of 50°–180°C., an iodine value not exceeding 180 and a Gardner color of not more than 5, said process comprising heating at a temperature of 250°–300°C. a solution of a monomeric mixture consisting of 90–60% by weight of a cyclopentadiene type monomer selected from the group consisting of cyclopentadiene, methylcyclopentadiene, dicyclopentadiene, methyldicyclopentadiene and dimethylcyclopentadiene and 10–40% by weight of a chain conjugated diolefin monomer of 4–5 carbon atoms at a monomer concentration of 70–95% by weight in a hydrocarbon solvent inert to thermal polymerization conditions to effect the thermal polymerization of said monomeric mixture and thereafter recovering the resulting polymer from the solvent.

2. A process for preparing a substantially gel-free thermoplastic resin having a softening point of 50°–180°C., an iodine value not exceeding 180 and a Gardner color of not more than 5, said process comprising heating at a temperature of 250°–300°C. a solution of a monomeric mixture consisting of 90–70% by weight of a cyclopentadiene type monomer selected from the group consisting of cyclopentadiene, methylcyclopentadiene, dicyclopentadiene, methyldicyclopentadiene and dimethylcyclopentadiene and 10–30% by weight of a chain conjugated diolefin monomer of 4–5 carbon atoms at a monomer concentration of 70–95% by weight in a hydrocarbon solvent inert to thermal polymerization conditions to effect the thermal polymerization of said monomeric mixture and thereafter recovering the resulting polymer from the solvent.

3. A process for preparing a substantially gel-free thermoplastic resin having a softening point of 50°–180°C., an iodine value not exceeding 180 and a Gardner color of not more than 5, said process comprising heating for 0.5–10 hours at a temperature of 250°–300°C. a solution of a monomeric mixture consisting of 90–60% by weight of a cyclopentadiene type monomer selected from the group consisting of cyclopentadiene, methylcyclopentadiene, dicyclopentadiene, methyldicyclopentadiene and dimethylcyclopentadiene and 10–40% by weight of a chain conjugated diolefin monomer of 4–5 carbon atoms at a monomer concentration of 70–95% by weight in a hydrocarbon solvent inert to thermal polymerization of said monomeric mixture until a conversion of at least 70% is attained and thereafter recovering the resulting polymer from the solvent.

4. The process of claim 1 wherein said chain conjugated diolefin monomer is a compound selected from the group consisting of 1,3-butadiene, isoprene, 1,3-pentadiene and chloroprene.

5. The process of claim 1 wherein said monomeric mixture contains in addition to the cyclopentadiene type monomer and chain conjugated diolefin monomer a comonomer in an amount not in excess of 10% by weight.

6. The process of claim 1 which comprises using as said cyclopentadiene type monomer a fraction whose content of dicyclopentadiene is at least 90% by weight and total content of cyclopentadiene type monomers is at least 95% by weight.

* * * * *